Oct. 15, 1963
A. HASBROUCK ETAL
3,107,099
ROTATING SHAFT SEAL ARRANGEMENT
Filed Nov. 27, 1961
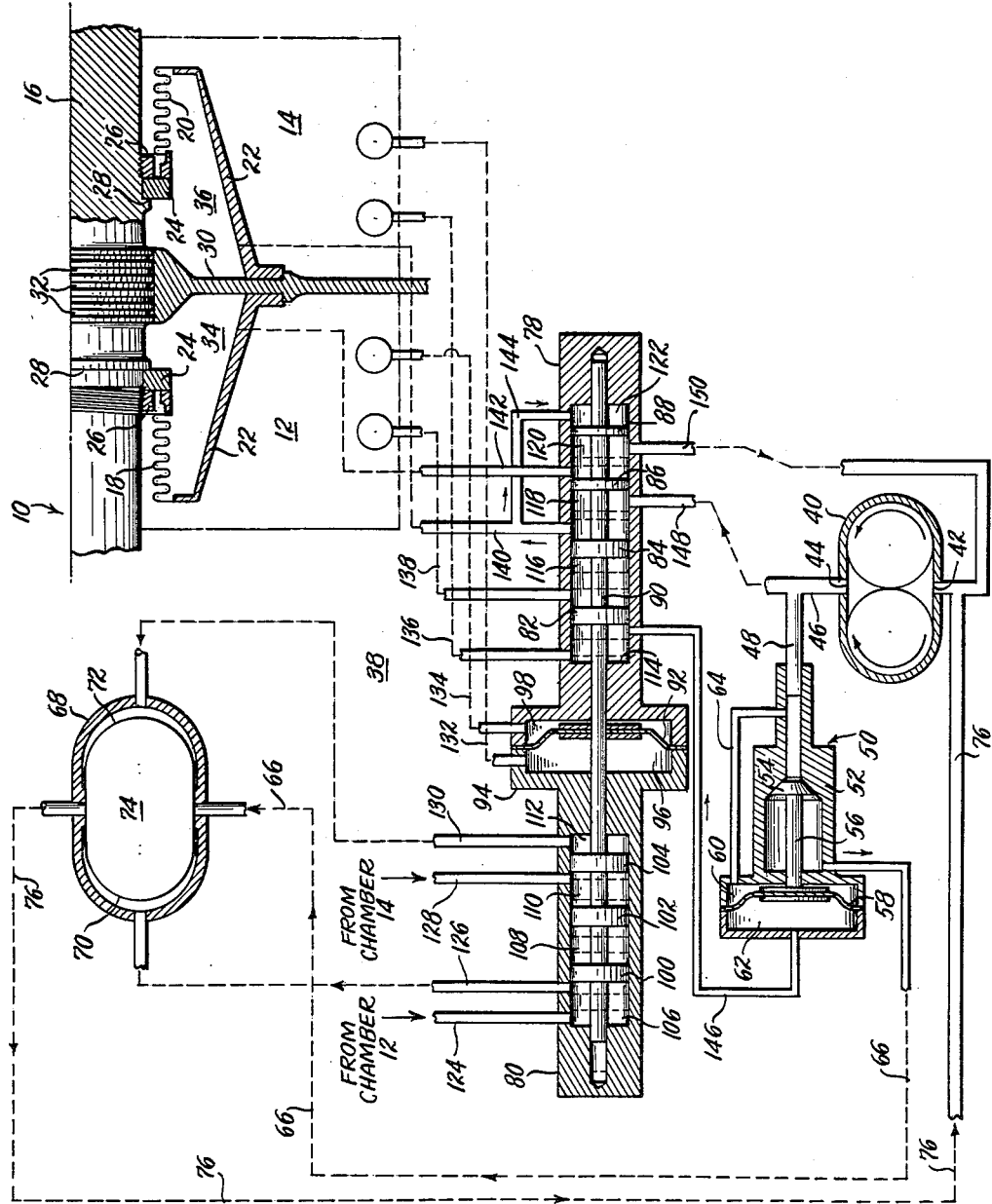
INVENTORS
AUGUSTUS HASBROUCK
REX A. HORROCKS
BY
Raymond W Cotter
ATTORNEY United States Patent Office 3,107,099
Patented Oct. 15, 1963

3,107,099
ROTATING SHAFT SEAL ARRANGEMENT
Augustus Hasbrouck, Middletown, and Rex A. Horrocks, Marlborough, Conn., assignors to United Aircraft Corporation, East Hartford, Conn., a corporation of Delaware
Filed Nov. 27, 1961, Ser. No. 155,157
17 Claims. (Cl. 277—3)

This invention relates to a novel rotating shaft seal arrangement, and more specifically to an arrangement for automatically maintaining counterbalancing pressures across rotating seals in an apparatus operating on fluids having widely varying pressures.

While not limited thereto, the invention finds particular application in an arrangement, including a rotating shaft, wherein a pair of adjacent fluid chambers may contain the same fluid, or different fluids, under different and widely varying pressures. The pressure differential between these fluid chambers can be very high, on the order of about 2000 p.s.i., for example, and the pressure differential can be reversed. There is, therefore, a problem of providing and maintaining an effective seal between these two fluid chambers. Applicants have solved this problem in a unique manner by providing a pair of sealing chambers between the fluid chambers. A pair of rotating seals is provided, one between each fluid chamber and each sealing chamber, and a rotating or fixed seal is provided between the two sealing chambers. The invention provides means to automatically equalize the pressures across each rotating seal, and to maintain this condition in the event of a variation of the pressure differential between the two fluid chambers.

It is an object of this invention, therefore, to provide a novel rotating shaft seal arrangement which effectively prevents leakage across a rotating seal.

It is a further object to provide a novel rotating shaft seal arrangement in which sealing chambers, which contain fluid under pressure, counterbalance the pressures across the seals to prevent leakage.

It is a further object to provide a novel rotating shaft seal arrangement in a system having fluid chambers at different and widely varying pressures in which sealing chambers prevent leakage from one fluid chamber to the other.

It is a still further object to provide, in an arrangement of the character described, an automatic system to rebalance the equalizing pressures across the rotating seals in response to a change in pressure in either pressure chambers.

It is a still further object to provide, in an arrangement of the character described, an automatic control system, responsive to the pressure differential in the fluid chambers, to automatically rebalance the equalizing pressures across the rotating seals, in the event of a variation in such differential pressure, by admitting sealing fluid under presure to, or discharging fluid from, the sealing chambers.

The attainment of the above objects and other objects and advantages will be evident from a consideration of the following detailed description in conjunction with the accompanying drawing, in which the single FIGURE illustrates a diagrammatic representation of a preferred system.

Referring to the single FIGURE in the accompanying drawing, which illustrates a diagrammatic hook-up of a device having a rotating shaft and a pair of fluid chambers under different pressures, and a control means adapted to maintain a balancing pressure in a pair of sealing chambers, the numeral 10 designates the device in its entirety, which may be any machine having a first fluid chamber 12 and a second fluid chamber 14, and a rotating shaft 16. Sealing is provided by a first stationary seal 18 and a second stationary seal 20. Each of the seals 18 and 20 is attached, at one end, to an annular wall 22 which is fixed against rotation, and at the other end each seal contacts a rotating collar 24 which is tightly urged against a shoulder 28 on the shaft by a threaded ring 26. A stationary shaft sealing means 30, having an inner surface cooperatingly engaging a series of parallel grooves 32 carried by the shaft 16, forms a sealing means to limit fluid flow along the shaft from one side of the shaft sealing means 30 to the other side. The shaft sealing means 30 is fixed against rotation, and supports the annular walls 22. It is evident, therefore, that the seal 18, left hand wall 22 and the shaft sealing means 30 define a sealing chamber 34 in which the seal 18 and the left hand wall 22 form a partition between the fluid chamber 12 and the sealing chamber 34. Similarly, the seal 20, the right hand wall 22 and the shaft sealing means 30 define a second sealing chamber 36 in which the seal 20 and the right hand wall 22 form a partition between the fluid chamber 14 and the sealing chamber 36.

The fluid chambers 12 and 14 may contain the same fluid under different pressures, or may contain different fluids. These fluids are under widely varying pressures, in which the differential can be very high, in the order of 2,000 pounds per square inch. The pressure differential can reverse, i.e., chamber 12 may have the higher pressure, or, chamber 14 may have the higher pressure. If the fluids in the chambers 12 and 14 are different, they can be either compatible or incompatible.

It may be seen, from the foregoing, that a serious problem is posed in preventing leakage across the stationary seals 18 and 20. This problem has been effectively solved by maintaining, in the sealing chambers 34 and 36, pressures which, at all times, counterbalance the pressures in the fluid chambers 12 and 14, respectively. Under such circumstances, the pressures across the stationary seals 18 and 20 are counterbalanced, and these seals are not subjected to any large pressure stresses. Leakage between the sealing chambers 34 and 36 is restricted by the shaft sealing means 30, which is of a type that can withstand great pressure differences. Moreover, should there be some slight leakage across the shaft sealing means 30, no harm is done, as the same fluid occupies both sealing chambers 34 and 36, and means are provided to automatically maintain the counterbalancing pressures in the chambers 34 and 36 by adding make-up sealing fluid to one chamber and/or to drain fluid from the other, in accordance with the pressure differences existing. This is done automatically by a control means, designated in its entirety, by the numeral 38.

The control means 38 comprises a suitable pump, shown as a gear pump 40, having a pair of mating gears rotating in the directions indicated by the arrows, and having a pump inlet 42 and a pump outlet 44. The pump outlet 44 is connected by a connection 48 with the fluid inlet of a by-pass valve 50 having a housing 52 forming a valve seat for a movable valve member 54 joined by a valve stem 56 with a movable wall 58 dividing the housing into opposed pressure chambers 60 and 62. A connection 64 joins the by-pass valve inlet with the pressure chamber 60. The outlet of the by-pass valve 50 is in fluid communication with a fluid make-up tank 68 by way of a fluid connection 66.

The fluid make-up tank 68 includes a pair of bladders or movable walls 70 and 72, in spaced, opposed relation, forming between them an intermediate make-up fluid chamber 74. The connection 66 from the by-pass valve 50 discharges into the make-up chamber 74. A connection 76 provides communication between the make-up chamber 74 and the pump inlet 42.

The invention includes a first fluid distribution valve 78 and a second fluid distribution valve 80 to make the necessary connections between the fluid chambers 12 and 14 and the sealing chambers 34 and 36, and the pump 40, by-pass valve 50 and the fluid make-up tank 68. Distribution valve 78 includes a series of spaced lands 82, 84, 86 and 88 interconnected with a rod 90 attached to a movable wall 92 of a differential pressure device 94 having a pair of opposed pressure chambers 96 and 98. Rod 90 also carries a series of spaced lands 100, 102 and 104 slidable within the distribution valve 80. Distribution valve 80 includes a chamber 106 between the left hand end wall and the land 100, a chamber 108 between the lands 100 and 102, a chamber 110 between the lands 102 and 104, and a chamber 112 between the land 104 and the right hand end wall. Similarly, distribution valve 78 includes a chamber 114 between the left hand end wall and land 82, a chamber 116 between lands 82 and 84, a chamber 118 between lands 84 and 86, a chamber 120 between lands 86 and 88, and a chamber 122 between land 88 and the right hand end wall.

The control system also includes the following connections: connection 124 between the fluid chamber 12 and chamber 106 in distribution valve 80; connection 126 between one side of the movable wall 70 and the chamber 106 (or 108) in distribution valve 80; connection 128 between fluid chamber 14 and the chamber 110 (or 112) in distribution valve 80; connection 130 between one side of movable wall 72 and chamber 112 in distribution valve 80; connection 132 between the opposed chamber 96 and the fluid chamber 14; connection 134 between the opposed chamber 98 and the fluid chamber 12; connection 136 between chamber 114 in distribution valve 78 and fluid chamber 14; connection 138 between chamber 116 in distribution valve 78 and fluid chamber 12, connection 140 between chamber 118 in distribution valve 78 and sealing chamber 36; connection 142 between chamber 120 in distribution valve 78 and sealing chamber 34; connection 144 between chamber 122 in distribution valve 78 and sealing chamber 36 including part of connection 140; connection 146 between the left hand chamber 62 of the by-pass valve 50 and the chamber 114 or chamber 116 in distribution valve 78, depending on position of valve 90; connection 148 between the connection 46 and pump outlet 44 and the chamber 118 (or 120) in distribution valve 78, and connection 150 between the pump inlet 42 and chamber 120 (or 122) in distribution valve 78. In the above description of connections, first reference is made to the position of the chambers in the distribution valves 78 and 80 as appearing in full lines in the drawing, and the references within the parentheses relate to the positions of the chambers when the lands are in the dash line positions.

Since the cross sectional area of the movable wall 92 exposed to the pressure chambers 96 and 98 is the same, the movable wall and the rod 90, as well as the lands connected thereto, will be moved toward the right or to the left in dependence on the greater pressure existing in fluid chamber 14 or in fluid chamber 12.

The drawing illustrates the position occupied by the distribution valves 78 and 80 and differential pressure device 94 when the pressure existing in fluid chamber 14 is higher than that existing in fluid chamber 12. The lands 82, 84, 86, 88, 100, 102 and 104, and the movable wall 92 occupy the position shown in solid lines. When the pressure in fluid chamber 12 is higher than that existing in fluid chamber 14, the lands occupy the position shown in dash lines, and the movable wall 92 is moved toward the left.

When the distribution valves 78 and 80 occupy the position shown in solid lines, as a result of a greater pressure in fluid chamber 14 than in fluid chamber 12, the following control functions occur:

Fluid chamber 14 is placed in communication with the left hand pressure chamber 62 of the by-pass valve 50 by way of connection 136, chamber 114 and connection 146, and sealing chamber 36 is placed in communication with the right hand pressure chamber 60 by way of the connection 140, chamber 118, and connections 148, 48 and 64. If the pressure in fluid chamber 14 exceeds the counterbalancing pressure in sealing chamber 36, acting in the pressure chamber 60, the movable wall 58 moves the movable valve member 54 toward its seat to throttle the by-pass valve 50. The outlet 44 from the pump 40 communicates by way of connections 46, 148 chamber 118, and connection 140, with the sealing chamber 36 to increase the pressure therein. Fluid pressure from the pump 40 acts, through the branch connection 144, in the chamber 122 to counterbalance the pressure in chamber 114. Intermediate make-up chamber 74 of make-up tank 68 communicates with the pump inlet 42 by connection 76 to supply make-up fluid, and communicates, by way of connection 76, connection 150, chamber 120 and connection 142 with the sealing chamber 34 to permit the equalization of the pressure in sealing chamber 34 with the pressure in fluid chamber 12. Fluid chamber 12 is placed in communication with the left hand side of the movable wall 70 by way of connection 124, chamber 106 and connection 126, which pressurizes the intermediate make-up chamber 74 and the connections 76, 150 and 142 to a value equal to that existing in the fluid chamber 12, whereby the pressure of the fluid in the sealing chamber 34 is permitted to equalize the pressure in the fluid chamber 12. As soon as the pressure in the sealing chamber 36 equals the pressure in fluid chamber 14, the pressure acts in the connections 46, 48 and 64 to move the movable wall 58 toward the left to decrease the throttling by the by-pass valve 54 to by-pass more fluid from the pump 40. Pump 40, which is continually in operation, supplies fluid under sufficent pressure to the sealing chamber 36 to counterbalance the pressure in fluid chamber 14. Some of the fluid is by-passed and circulated through connections 46, 48, by-pass valve 50, connection 66, intermediate make-up chamber 74, and connection 76 to pump inlet 42. If the pressure in fluid chamber 14 should decrease, the valve 54 is opened more fully to permit the by-passing of more sealing fluid, thereby correspondingly decreasing the pressure in sealing chamber 36.

If the pressure in fluid chamber 12 is greater than in fluid chamber 14, the movable wall 92 of the differential pressure device 94 is moved to its left hand position to move the lands in the distribution valves 78 and 80 to their dash lines position. The following control events take place:

Chamber 62 on the left hand of the movable wall 58 in the by-pass valve 50 communicates with the fluid chamber 12 by way of connection 146, chamber 116 and connection 138. If pressure in fluid chamber 12 exceeds the pressure in sealing chamber 34, effective in pressure chamber 60 against the movable wall 58, the movable wall 58 is moved to the right to bring the movable valve member 54 toward its seat to throttle the by-pass valve. Pump outlet 44 communicates, by way of connections 46 and 148, chamber 120 and connection 142, with the sealing chamber 34, permitting the pressure in chamber 34 to increase to a value equal to that in fluid chamber 12. Sealing chamber 36 is placed in communication with the intermediate make-up chamber 74 by way of connections 140 and 144, chamber 122, and connections 150 and 76, permitting the balancing of the pressure in the sealing chamber 36 with the pressure in fluid chamber 14. Fluid chamber 14 is placed in communication with chamber 114 by way of the connection 136 to balance the pressure acting in chamber 122. Fluid chamber 14 is also placed in communication with the right hand side of the movable fall 72 in the make-up tank 68 by way of connection 128, chamber 112, and connection 130, to pressurize the make-up fluid in the intermediate make-up chamber 74 and in the connections 76, 150, 144 and 140 to a value equal to that existing in fluid chamber 14, whereby the counterbalancing pressure in sealing chamber 36 is permitted to decrease to a value equal to that existing in fluid chamber 14. Make-up fluid is supplied from the intermediate make-up chamber 74 to the pump inlet 42 by way of connection 76, the make-up fluid being fed, under pressure, from the pump outlet 44, connections 46 and 148, chamber 120 and connection 142 to sealing chamber 34 to increase the pressure therein until it counterbalances the pressure in fluid chamber 12. When the pressure in sealing chamber 34 counterbalances the pressure in fluid chamber 12, such pressure is effective in chamber 60 on the right hand side of the movable wall 58 in the by-pass valve 50, to cause opening movement of the movable valve member 54 to decrease the throttling action of the by-pass valve, permitting by-passing of part of the pumped fluid by way of connections 46, 48, by-pass valve 50, connection 66, intermediate make-up chamber 74 and connection 76 to the pump inlet 42. If the pressure in fluid chamber 12 should decrease, the movable wall 58 and the by-pass valve element 54 are moved toward the left to permit an increased by-pass of fluid from the pump discharge. This results in a pressure drop in the sealing chamber 34 corresponding to that in the fluid chamber 12 and a re-counterbalancing of the pressures in chambers 12 and 34.

The flow capacity in the connection 76, which supplies make-up fluid from the intermediate make-up chamber 74 to the pump inlet 42, must be greater than the capacity of the pump, so that operation of the pump does not interfere with the pressure in the connections 76, 150 and the connections between the distribution valve 78 and the sealing chambers 34 and 36.

It is evident that, instead of two distribution valves, a single distribution valve can be used. If the fluids in the chambers 12 and 14 are incompatible, it is evident that different distribution valves can be used in the connections with each fluid chamber so that there can be no possible mixing of the fluids in the distribution valve chambers as the result of leakage across the lands therein.

Having fully described our invention, it is to be understood that we do not wish to be limted to the particular arrangement shown diagrammatically herein, but that various changes may be made without departing from the principles of the invention or from the scope of the annexed claims.

We claim:

1. A device having means providing a pair of fluid chambers operating at different and varying pressures and having a rotating shaft, and a shaft seal comprising means providing a pair of sealing chambers; a shaft sealing means forming a first partition between said sealing chambers; a first stationary seal, connected with said shaft, forming a second partition between one of said fluid chambers and one of said sealing chambers; a second stationary seal, connected with said shaft, forming a third partition between the other fluid chamber and the other sealing chamber; and means automatically counterbalancing the pressures across said second partition and across said third partition.

2. A device and shaft seal as defined in claim 1, in which said shaft sealing means is fixed against rotation.

3. A device and shaft seal as defined in claim 1, in which said shaft sealing means is fixed against rotation, and in which said stationary seals cooperate with said shaft on opposite sides of said shaft sealing means.

4. A device having means providing a pair of fluid chambers operating at different and varying pressures and having a rotating shaft, and a shaft seal comprising means providing a pair of sealing chambers; shaft sealing means forming a first partition between said sealing chambers; a first stationary seal, cooperating with said shaft, forming a second partition between one of said fluid chambers and one of said sealing chambers; a second stationary seal, cooperating with said shaft, forming a third partition between the other fluid chamber and the other sealing chamber; and control means, including means responsive to a variation in pressure in one of said fluid chambers, maintaining counterbalanced pressures across said second partition and across said third partition.

5. A device having means providing a pair of fluid chambers operating at different and varying pressures and having a rotating shaft, and a shaft seal comprising means providing a pair of sealing chambers; sealing means, cooperating with said shaft, forming a first partition between said sealing chambers; a first stationary seal, cooperating with said shaft, forming a second partition between one of said fluid chambers and one of said sealing chambers; a second stationary seal, cooperating with said shaft, forming a third partition between the other fluid chamber and the other sealing chamber; and control means, including means responsive to the pressure differential between said fluid chambers, maintaining counterbalanced pressures across said second partition and across said third partition.

6. A shaft seal for a device having means providing a pair of fluid chambers operating at different and varying pressures and a rotating shaft, comprising: means providing a pair of sealing chambers; sealing means, cooperating with said shaft, forming a first partition between said sealing chambers; a first stationary seal, cooperating with said shaft, forming a second partition between one of said fluid chambers and one of said sealing chambers; a second stationary seal, cooperating with said shaft, forming a third partition between the other fluid chamber and the other sealing chamber; and control means, including means responsive to the pressure differential between said fluid chambers, a pump, fluid connection means between said pump and said sealing chambers, and a distribution valve, connected with said differential pressure responsive means, in said fluid connection means, maintaining counterbalanced pressures across said second partition and across said third partition.

7. A shaft seal for a device having means providing a pair of fluid chambers operating at different and varying pressures and a rotating shaft, comprising: means providing a pair of sealing chambers; sealing means, cooperating with said shaft, forming a first partition between said sealing chambers; a first stationary seal, cooperating with said shaft, forming a second partition between one of said fluid chambers and one of said sealing chambers; a second stationary seal, cooperating with said shaft, forming a third partition between the other fluid chamber and the other sealing chamber; and control means, including means responsive to the pressure differential between said fluid chambers, a pump, a pressure actuated by-pass valve including opposed differential pressure chambers, first fluid connection means between said pump and said sealing chambers, second fluid connection means between said pump and said by-pass valve, third fluid connection means between said fluid chambers and one of said by-pass valve differential pressure chambers, and fourth fluid connection means between said pump and another of said by-pass valve differential pressure chambers, and a distribution valve, connected with said first mentioned differential pressure responsive means, in said first and third fluid connection means, maintaining counter-balanced pressures across said second partition and across said third partition.

8. A shaft seal for a device having means providing a pair of fluid chambers operating at different and varying pressures and a rotating shaft, comprising: means providing a pair of sealing chambers; sealing means, cooperating with said shaft, forming a first partition between said sealing chambers; a first stationary seal, cooperating with said shaft, forming a second partition between one of said fluid chambers and one of said sealing chambers; a second stationary seal, cooperating with said shaft, forming a third partition between the other fluid chamber and the other sealing chamber; and control means, including means responsive to the pressure differential between said fluid chambers, a fluid make-up supply means, and fluid connections between said fluid make-up supply means and said sealing chambers, maintaining counterbalanced pressures across said second partition and across said third partition.

9. A shaft seal for a device having means providing a pair of fluid chambers operating at different and varying pressures and a rotating shaft, comprising: means providing a pair of sealing chambers; sealing means, cooperating with said shaft, forming a first partition between said sealing chambers; a first stationary seal, cooperating with said shaft, forming a second partition between one of said fluid chambers and one of said sealing chambers; a second stationary seal, cooperating with said shaft, forming a third partition between the other fluid chamber and the other sealing chamber; and control means, including means responsive to the pressure differential between said fluid chambers, fluid make-up supply means having a movable wall, first fluid connection means between one side of said movable wall and one of said sealing chambers, and second fluid connection means between the other side of said movable wall and a fluid chamber in counterbalanced relation with said one sealing chamber, maintaining counterbalanced pressures across said second partition and across said third partition.

10. A shaft seal for a device having means providing a pair of fluid chambers operating at different and varying pressures and a roating shaft, comprising: means providing a pair of sealing chambers; sealing means, cooperating with said shaft, forming a first partition between said sealing chambers; a first stationary seal, cooperating with said shaft, forming a second partition between one of said fluid chambers and one of said sealing chambers; a second stationary seal, cooperating with said shaft, forming a third partition between the other fluid chamber and the other sealing chamber; and control means, including means responsive to the pressure differential between said fluid chambers, fluid make-up supply means having a movable wall, first fluid connection means between one side of said movable wall and one of said fluid chambers, second fluid connection means between the other side of said movable wall and a sealing chamber in counterbalanced relation with said one fluid chamber, and a distribution valve, connected with said differential pressure responsive means, in said first fluid connection means, maintaining counterbalanced pressures across said second partition and across said third partition.

11. A shaft seal for a device having means providing a pair of fluid chambers operating at different and varying pressures and a rotating shaft, comprising: means providing a pair of sealing chambers; sealing means, cooperating with said shaft, forming a first partition between said sealing chambers; a first stationary seal, cooperating with said shaft, forming a second partition between one of said fluid chambers and one of said sealing chambers; a second stationary seal, cooperating with said shaft, forming a third partition between the other fluid chamber and the other sealing chamber; and control means, including means responsive to the pressure differential between said fluid chambers, fluid make-up supply means having a pair of movable walls and an intermediate make-up fluid chamber, first fluid connection means between one side of one movable wall and one of said fluid chambers, second fluid connection means between said make-up fluid chamber and the sealing chamber in counterbalanced relation with said one fluid chamber, third fluid connection means between one side of the other movable wall and the other fluid chamber, fourth fluid connection means between said make-up fluid chamber and said other sealing chamber, and a distribution valve, connected with said differential pressure responsive means, in said first and said third fluid connection means, maintaining counterbalanced pressures across said second partition and across said third partition.

12. A shaft seal for a device having means providing a pair of fluid chambers operating at different and varying pressures and a rotating shaft, comprising: means providing a pair of sealing chambers; sealing means, cooperating with said shaft, forming a first partition between said sealing chambers; a first stationary seal, cooperating with said shaft, forming a second partition between one of said fluid chambers and one of said sealing chambers; a second stationary seal, cooperating with said shaft, forming a third partition between the other fluid chamber and the other sealing chamber; and control means, including means responsive to the pressure differential between said fluid chambers, fluid make-up supply means having a pair of movable walls and an intermediate make-up fluid chamber, first fluid connection means between one side of one movable wall and one of said fluid chambers, second fluid connection means between said make-up fluid chamber and the sealing chamber in counterbalanced relation with said one fluid chamber, third fluid connection means between one side of the other movable wall and the other fluid chamber, fourth fluid connection means between said make-up fluid chamber and the other sealing chamber, a first distribution valve, connected with said differential pressure responsive means, in said second and fourth fluid connection means, and a second distribution valve, connected with said differential pressure responsive means, in said first and third fluid connection means, maintaining counterbalanced pressures across said second partition and across said third partition.

13. A shaft seal for a device having means providing a pair of fluid chambers operating at different and varying pressures and a rotating shaft, comprising: means providing a pair of sealing chambers; sealing means, cooperating with said shaft, forming a first partition between said sealing chambers; a first stationary seal, cooperating with said shaft, forming a second partition between one of said fluid chambers and one of said sealing chambers; a second stationary seal, cooperating with said shaft, forming a third partition between the other fluid chamber and the other sealing chamber; and control means, including means responsive to the pressure differential between said fluid chambers, a pump having an inlet and an outlet, fluid make-up means, fluid connection means between said pump outlet and said sealing chambers, between said make-up means and said pump inlet, and between said make-up means and said fluid chambers, a first distribution valve, connected with said differential pressure responsive means, in said connection means between said pump outlet and said sealing chambers, and a second distribution valve, connected with said differential pressure responsive means, in said connection means between said make-up means and said fluid chambers, maintaining counterbalanced pressures across said second partition and across said third partition.

14. A shaft seal for a device having means providing a pair of fluid chambers operating at different and varying pressures and a rotating shaft, comprising: means providing a pair of sealing chambers; sealing means, cooperating with said shaft, forming a first partition between said sealing chambers; a first stationary seal, cooperating with said shaft, forming a second partition between one of said fluid chambers and one of said sealing chambers; a second stationary seal, cooperating with said shaft, forming a third partition between the other fluid chamber and the other sealing chamber; and control means, including means responsive to the pressure differential between said fluid chambers, a pump having an inlet and an outlet, fluid make-up means having a pair of movable walls and an intermediate make-up fluid chamber, first fluid connection means between the pump outlet and the sealing chambers, second fluid connection means between one side of one movable wall and one fluid chamber, third fluid connection means between one side of the other movable wall and the other fluid chamber, fourth connection means between the make-up fluid chamber and said pump inlet, a first distribution valve, connected with said differential pressure responsive means, in said first fluid connection means, and a second distribution valve, connected with said differential pressure responsive means, in said second and said third fluid connection means, maintaining counterbalanced pressures across said second partition and across said third partition.

15. A shaft seal for a device having means providing a pair of fluid chambers operating at different and varying pressures and a rotating shaft, comprising: means providing a pair of sealing chambers; sealing means, cooperating with said shaft, forming a first partition between said sealing chambers; a first stationary seal, cooperating with said shaft, forming a second partition between one of said fluid chambers and one of said sealing chambers; a second stationary seal, cooperating with said shaft, forming a third partition between the other fluid chamber and the other sealing chamber; and control means, including means responsive to the pressure differential between said fluid chambers, a pump having an inlet and an outlet, fluid make-up means having a pair of movable walls and an intermediate make-up fluid chamber, first fluid connection means between said pump outlet and the sealing chambers, second fluid connection means between one side of one movable wall and one fluid chamber, third fluid connection means between one side of the other movable wall and the other fluid chamber, fourth fluid connection means between the make-up fluid chamber and the pump inlet, and fifth fluid connection means between said make-up fluid chamber and said sealing chambers, a first distribution valve, connected with said differential pressure responsive means, in said first and fifth fluid connection means, and a second distribution valve, connected with said differential pressure responsive means, in said second and third fluid connection means, maintaining counterbalanced pressures across said second partition and across said third partition.

16. A shaft seal for a device having means providing a pair of fluid chambers operating at different and varying pressures and a rotating shaft, comprising: means providing a pair of sealing chambers; sealing means, cooperating with said shaft, forming a first partition between said sealing chambers; a first stationary seal, cooperating with said shaft, forming a second partition between one of said fluid chambers and one of said sealing chambers; a second stationary seal, cooperating with said shaft, forming a third partition between the other fluid chamber and the other sealing chamber; and control means, including means responsive to the pressure differential between said fluid chambers, a pump having an inlet and an outlet, a by-pass valve having an inlet and an outlet and a differential pressure responsive means including a movable wall and a pair of opposed pressure chambers, fluid make-up means having a pair of movable walls and an intermediate make-up fluid chamber, first fluid connection means between the pump outlet and the sealing chambers, second fluid connection means between one side of one movable wall and one fluid chamber, third fluid connection means between one side of the other movable wall and the other fluid chamber, fourth fluid connection means between said intermediate make-up fluid chamber and the pump inlet, fifth fluid connection means between said intermediate make-up fluid chamber and said sealing chambers, sixth fluid connection means between said pump outlet and said intermediate make-up fluid chamber including said by-pass valve, seventh fluid connection means between said pump outlet and one opposed pressure chamber of said differential pressure responsive means connected with said by-pass valve, eighth fluid connection means between said fluid chambers and the other opposed pressure chamber of said differential pressure responsive means, a first distribution valve, connected with said first mentioned differential pressure responsive means, in said first, fifth and eighth fluid connection means, and a second distribution valve, connected with said first mentioned pressure responsive means, in said second and third fluid connection means, maintaining counterbalanced pressures across said second partition and across said third partition.

17. A shaft seal for a device having means providing a pair of fluid chambers operating at different and varying pressures and a rotating shaft, comprising: means providing a pair of sealing chambers; sealing means, cooperating with said shaft, forming a first partition between said sealing chambers; a first stationary seal, cooperating with said shaft, forming a second partition between one of said fluid chambers and one of said sealing chambers; a second stationary seal, cooperating with said shaft, forming a third partition between the other fluid chamber and the other sealing chamber; and control means, including means responsive to the pressure differential between said fluid chambers, a pump having an inlet and an outlet, a by-pass valve having an inlet and an outlet and a differential pressure responsive means including a movable wall and a pair of opposed pressure chambers, fluid make-up means having a pair of movable walls and an intermediate make-up fluid chamber, first fluid connection means between the pump outlet and the sealing chambers, second fluid connection means between one side of one movable wall of said make-up fluid chamber and one fluid chamber, third fluid connection means between one side of the other movable wall of said make-up fluid chamber and the other fluid chamber, fourth fluid connection means between said intermediate make-up fluid chamber and the pump inlet, fifth fluid connection means between said intermediate make-up fluid chamber and said sealing chambers, sixth fluid connection means between said pump outlet and said intermediate make-up fluid chamber including said by-pass valve, seventh fluid connection means between said pump outlet and one opposed pressure chamber of said differential pressure responsive means connected with said by-pass valve, eighth fluid connection means between said fluid chambers and the other opposed pressure chamber of said differential pressure responsive means connected with said by-pass valve, and distribution valve means connected with said first mentioned differential pressure responsive means, in said first, second, third, fifth and eighth fluid connection means, maintaining counterbalanced pressures across said second partition and across said third partition.

References Cited in the file of this patent
UNITED STATES PATENTS

| | | |
|---|---|---|
| 1,835,877 | Joyce | Dec. 8, 1931 |
| 2,496,471 | Hornbostel | Feb. 7, 1960 |
| 3,005,518 | Jassniker | Oct. 24, 1961 |